C. S. CORRIGAN.
CONTROL BRACKET GEAR FOR DEEP WELL ENLARGING AND CISTERN MAKING MACHINES.
APPLICATION FILED JULY 25, 1921.
1,406,351.
Patented Feb. 14, 1922.
Fig. 1.
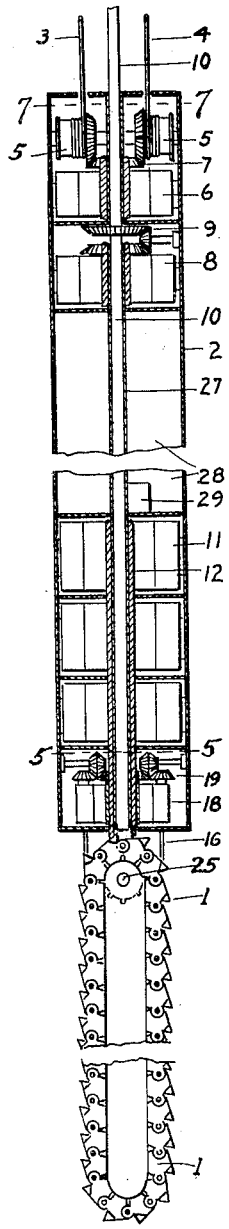
Fig. 2.
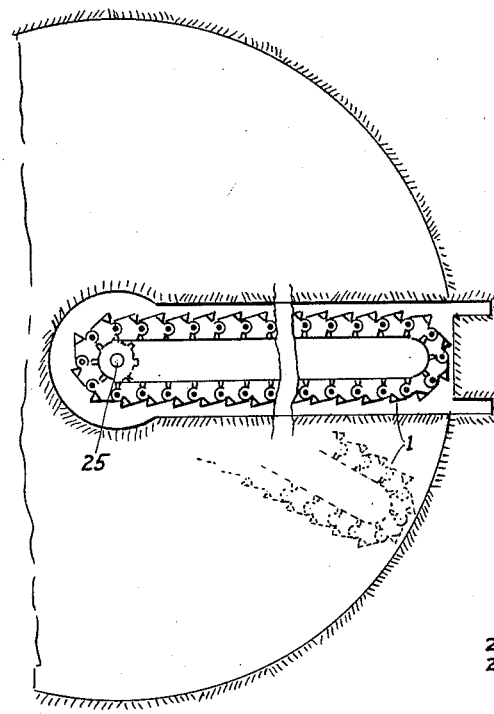
Fig. 3.
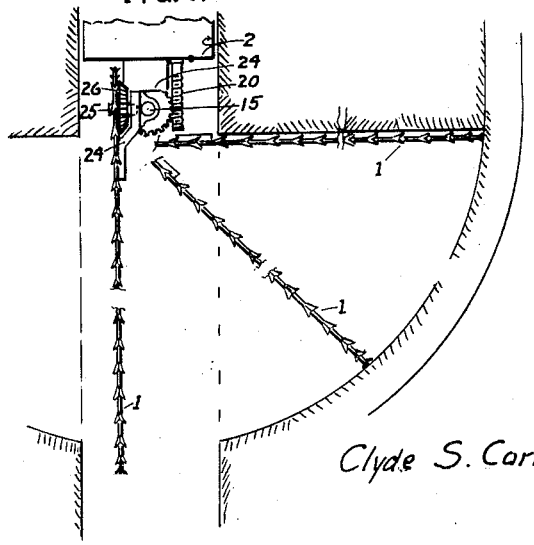
Fig. 4.
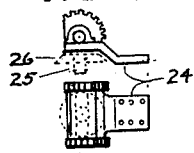
Fig. 5.
Clyde S. Corrigan. INVENTOR.

UNITED STATES PATENT OFFICE.

CLYDE S. CORRIGAN, OF NEW YORK, N. Y.

CONTROL BRACKET GEAR FOR DEEP-WELL-ENLARGING AND CISTERN-MAKING MACHINES.

1,406,351.   Specification of Letters Patent.   Patented Feb. 14, 1922.

Original application filed September 4, 1920, Serial No. 408,118. Divided and this application filed July 25, 1921. Serial No. 487,540.

*To all whom it may concern:*

Be it known that I, CLYDE S. CORRIGAN, a citizen of the United States, residing at New York, in the county and State of New York, have invented a new and useful Control Bracket Gear for Deep-Well-Enlarging and Cistern-Making Machines, of which the following is a specification.

This control bracket gear is designed primarily to provide means of attaching a kerf cutting chain saw, for sawing horizontal kerfs, to the deep well enlarging and cistern making machine shown in my application Ser. No. 408,118, filed Sep. 4, 1920, and is fully described and illustrated by the attached drawings and specifications, in which like numbers refer to similar parts throughout.

The drawing referred to was formerly Sheet 2, of the application above referred to, Fig. 8, being changed to Fig. 1, Fig. 9, to Fig. 2, Fig. 10, to Fig. 3, Fig. 11, to Fig. 4, and the plan part of Fig. 4, being marked Fig. 5.

Fig. 1 is a sectional view of a deep well enlarging and cistern making machine, with one saw for cutting horizontal kerfs.

Fig. 2 is a plan showing one saw, raised in a slot previously cut in the side of a well, ready to cut a horizontal kerf.

Fig. 3 is a side view showing one saw held by a control bracket gear, being raised to cut a horizontal kerf.

Fig. 4 is a side view of the control bracket gear.

Fig. 5 is a plan of the control bracket gear.

The same reference numbers are used, and refer to the same parts throughout as in the deep well enlarging and cistern making machine referred to above.

The control bracket gear 24 is primarily intended to provide means for operatively attaching a kerf cutting chain saw 1, to said deep well enlarging and cistern making machine, so that it may be operated and controlled to cut horizontal kerfs in the walls of a well.

The machine primarily consists of earth cutting chain saws or cutter bars 1, operated by power means enclosed in a casing 2, adapted to be lowered into a well by a sustaining and power conveying cable, and held for controlled rotary or vertical motion with respect to the walls of a well, by a fulcrum rod attached to a holding device.

Power wires 3 and control wires 4 are wound on a drum 5 positioned in the upper part of casing 2, and operated by motor 6 through bevel gears 7, to raise or lower the machine with reference to said holding device to which the wires 3 and 4 are attached before connecting with the sustaining cable.

Also positioned within casing 2 is a motor 8, oprating gears against fulcrum wheel 9 which is slidingly attached to fulcrum rod 10 to turn the machine to any vertical plane for entering vertical slots in the side of a well, and also to rotate the machine and cutting elements to cut a horizontal circular kerf when making underground tanks.

The saw 1 is operated by motor 11 through hollow shaft 12, gear 13, gear 14, and gear 26 attached to shaft 25 journaled in control bracket gear 24. The control bracket gear 24 is provided with 2 gears journaled on shaft 15 at right angles to that part of said bracket which is attached to the frame of saw 1, and when operated by worms 20, the saw may be raised to a horizontal position in any vertical slot, previously cut in the walls of a well.

When saw 1 is operating and has been raised in a vertical slot to a horizontal plane, the entire machine may be caused to rotate by operating motor 8, and the saw 1 made to cut a horizontal kerf in the said horizontal plane, thereby causing the material below the saw to drop to the bottom of the well; after cutting one circular kerf, the machine with its saw again in the aforementioned vertical slot, may be raised a short distance and the operation repeated until the excavation is completed.

Having described the construction and operation of my invention, I claim:—

1. In a machine of the character described, the combination of a casing, a sustaining and power conveying cable for lowering and holding said casing in a well, an earth cutting chain saw pivotally attached to the bottom of said casing, power means operatively connected to said saw, to cause it to swing to a horizontal plane within a slot previously cut in the wall of a well, power means to cause the casing and saw to revolve and cut a circular horizontal kerf, causing the earth and stone cut loose to drop to the bottom to be raised to the surface by suitable means, and power means of lifting the machine and saw in the aforementioned slot after sawing one circular horizontal kerf, to a higher position to repeat the operation until the desired height is reached.

2. In a machine of the character described, the combination of a casing, a sustaining and power conveying cable, for lowering and holding said casing in a well, an earth cutting chain saw attached to a control bracket gear, said gear being pivotally attached to the bottom of said casing, the saw frame being in a plane parallel to a plane through the pivot lengthwise, power means operatively connected to said control bracket gear to cause said saw to swing to a horizontal plane within a slot previously cut in the walls of a well, power means to cause the casing and saw to revolve and cut a circular horizontal kerf, causing the earth and stone cut loose to drop to the bottom to be raised to the surface by suitable means, and power means of then lifting the machine and saw to a higher position in the aforementioned slot to repeat the cutting of circular horizontal kerfs until the desired height is reached.

3. In a machine of the character described, a shaft, a saw, a control bracket gear, said control bracket gear having in combination two partially circular gears, adapted to be journaled loosely on said shaft, a bracket plate connecting said gears, said plate being in a plane parallel to a plane through the shaft lengthwise, and means by which said plate may be rigidly attached to the frame of said saw for movably controlling said saw by operating said gears.

CLYDE S. CORRIGAN.